United States Patent [19]

Hurlburt et al.

[11] Patent Number: 4,800,711
[45] Date of Patent: Jan. 31, 1989

[54] HEADER FOR HARVESTING MACHINE

[75] Inventors: Joseph C. Hurlburt; Peter J. Torland, both of Lancaster, Pa.

[73] Assignee: Ford New Holland, Inc., New Holland, Pa.

[21] Appl. No.: 64,286

[22] Filed: Jun. 19, 1987

[30] Foreign Application Priority Data

Jun. 24, 1986 [EP] European Pat. Off. ...... 86/201097.2

[51] Int. Cl.⁴ ............................................. A01D 57/00
[52] U.S. Cl. ...................................... 56/219; 56/10.2; 56/221; 56/224; 56/227; 56/DIG. 15
[58] Field of Search ................. 56/219, 221, 222, 224, 56/227, 10.2, DIG. 15

[56] References Cited

U.S. PATENT DOCUMENTS 3,208,208  9/1965  Schatz .
4,011,709  3/1977  Mott et al. .
4,124,970  11/1978  Berhardt .
4,204,383  5/1980  Milliken, Jr. .
4,280,318  7/1981  Koch .
4,565,056  1/1986  Heidjann .

FOREIGN PATENT DOCUMENTS

2011687  6/1969  France .
 895327  6/1978  U.S.S.R. .
1151981  1/1967  United Kingdom .

Primary Examiner—Douglas Hart
Attorney, Agent, or Firm—Larry W. Miller; Frank A. Seemar; Darrell F. Marquette

[57] ABSTRACT

A header for a harvesting machine having a frame, a cutterbar operable to a cut standing crop and mounted on the front of the frame, and a reel also mounted on the frame and operable to sweep crop material towards and over the cutterbar, the cutterbar being adjustable relative to the frame in a fore-and-aft direction, is disclosed wherein the header includes an interlock mechanism extending between the reel and the cutterbar such that the position of the reel relative to the cutterbar is automatically adjusted upon the fore-and-aft movement of the cutterbar to maintain a substantially constant reel-cutterbar spacing.

4 Claims, 6 Drawing Sheets

HEADER FOR HARVESTING MACHINE

BACKGROUND OF THE INVENTION

This invention relates generally to crop harvesting headers attachable to combines and, more particularly, to an interlock mechanism interconnecting the reel and a fore-and-aft adjustable cutterbar.

Typically, a header for a harvesting machine includes a cutterbar which is operable to cut standing crop as the machine moves forward and a rotatable reel which carries tines to engage the standing crop and sweep it towards the cutterbar for cutting and then carry the cut material towards an auger before releasing it. The auger usually consolidates the cut crop material centrally of the header before it is passed to the body of the machine for processing. The relationship between the cutterbar and the auger is critical and in general depends on the type and condition of the crop to be harvested. When harvesting down crops, i.e., crops that are not standing in a normal upright position, the relationships between the reel, the cutterbar and the auger is equally critical and, in general, the reel should be disposed so that the path described by the outer ends of the tines first enters below the level of the cutterbar forwardly thereof for lifting down crop, then sweeps closely over the cutterbar and finally passes in close proximity along the auger.

Headers are known in which the cutterbar is vertically flexible along its length so that it can follow local irregularities in the ground. With such headers, it is necessary to be able to adjust the height of the reel relative to the highest point of the cutterbar at any given instant, otherwise the cutterbar is likely to foul the reel on flexing with consequential damage to one or both components. To this end, headers having flexible cutterbars have been fitted with means for automatically adjusting the position of the reel on vertical flexure of the cutterbar.

Headers, such as shown in U.S. Pat. No. 4,011,709, have been provided to render the cutterbar adjustable in a generally fore-and-aft direction so that the spatial relationship between the auger and the cutterbar can be selectively chosen dependent on the type and condition of the crop to be harvested.

SUMMARY OF THE INVENTION

It is an object of the present invention to provide a header with a fore-and-aft adjustable cutterbar to suit various crops and crop conditions and which is not afflicted with the risk of reel/cutterbar interference upon adjustment of the cutterbar.

It is a feature of the instant invention to maintain at least the minimum clearance between the reel and the cutterbar substantially constant in response to the fore-and-aft movement of the cutterbar.

It is another object of the present invention to provide a header for a harvesting machine having an interlock mechanism extending between the reel and the cutterbar for automatically adjusting at least the minimum reel/cutterbar spacing upon fore-and-aft adjustment movement of the cutterbar whereby interference between the reel and the cutterbar during said adjustment movement is avoided.

It is an advantage of this invention that the interlock mechanism automatically adjusts at least the minimum reel height relative to the cutterbar upon generally fore-and-aft adjustment of the cutterbar.

It is another feature of this invention that the interlock mechanism may comprise a linkage mechanism at each side of the header and extending between the cutterbar and a hydraulic actuator which is operable to effect general adjustment of the reel via an arm, two such arms rotatably carrying the reel therebetween.

It is another advantage of this invention that each linkage may comprise a series of links, including a bell crank lever.

It is still another advantage of this invention that the interlock mechanism may comprise a hydraulic slave cylinder acting between the cutterbar and the header frame so that, as the cutterbar is adjusted, the length of the slave cylinder changes and the resulting oil displacement is used to control main hydraulic actuators operable to adjust the position of the reel.

It is another feature of this invention that adjustment of the position of the reel will normally be generally vertically, but may nevertheless include a fore-and-aft (i.e., generally horizontal) component to this reel movement.

BRIEF DESCRIPTION OF THE DRAWINGS

A header for a harvesting machine constructed in accordance with the present invention will now be described in greater detail, by way of example, with reference to the accompanying drawings wherein.

DETAILED DESCRIPTION OF THE PREFERRED EMBODIMENT

Figure 1:
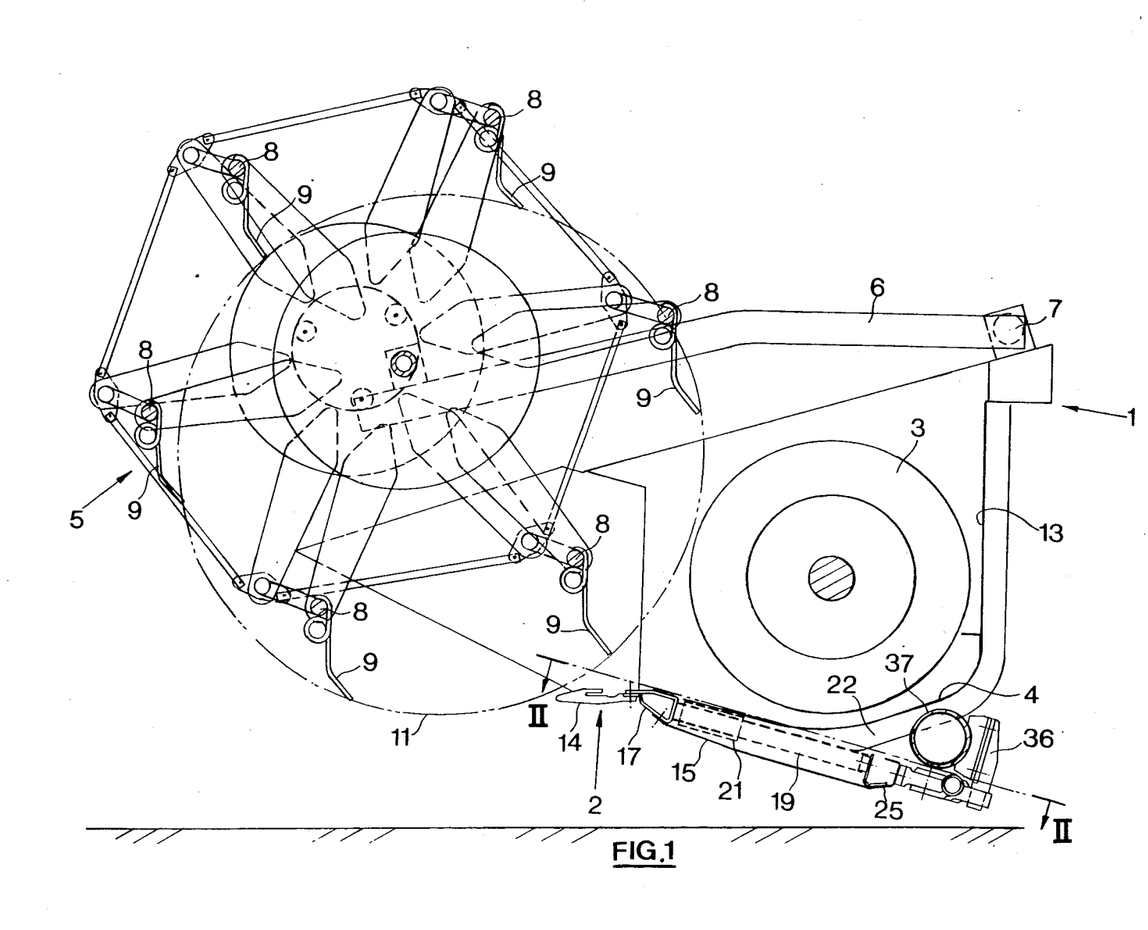
FIG. 1 is a side elevational view, partly in section, of a first embodiment of the invention, and with certain components removed and with the cutterbar in the fully retracted position.

Referring first to FIG. 1, the header of the first embodiment is basically conventional in that it comprises a frame 1, a cutterbar 2 mounted on the frame, an auger 3 mounted in an auger trough 4, and a reel 5 mounted for rotation between the forward ends of a pair of reel arms 6, the other ends of which are pivotally attached at 7 to the frame 1 in order that the reel can be raised and lowered by hydraulic actuators 10 (FIG. 7) which act between the arms and the frame. The reel 5 carries tine bars 8 fitted with tines 9 which are arranged to maintain a fixed orientation as the reel rotates, in a conventional manner. The outer tips of the tines 9 describe a circular path 11, when the header is operating in down crops, the reel 5 is positioned as close as possible to the cutterbar 2 in order to optimize the cooperation between the reel and cutterbar. More specifically the arrangement is such that the tine path 11 extends as close as possible to the ground forwardly of the cutterbar 2 to lift down crop for presenting it to the cutterbar 2 to pass crop to the auger 3 for consolidation centrally of the machine for passage through a central opening (not seen in the drawings) in the rear wall 13 of the header for processing by a conventional combine harvester (not shown) to which the header is, in use, fitted.

Depending on the nature and condition of the crop to be harvested, the cutterbar 2 has to be adjusted relative to the auger 3. In accordance with the present invention, the cutterbar is adjustable in a generally fore-and-aft direction of the machine for which the header is intended.

Figure 2:
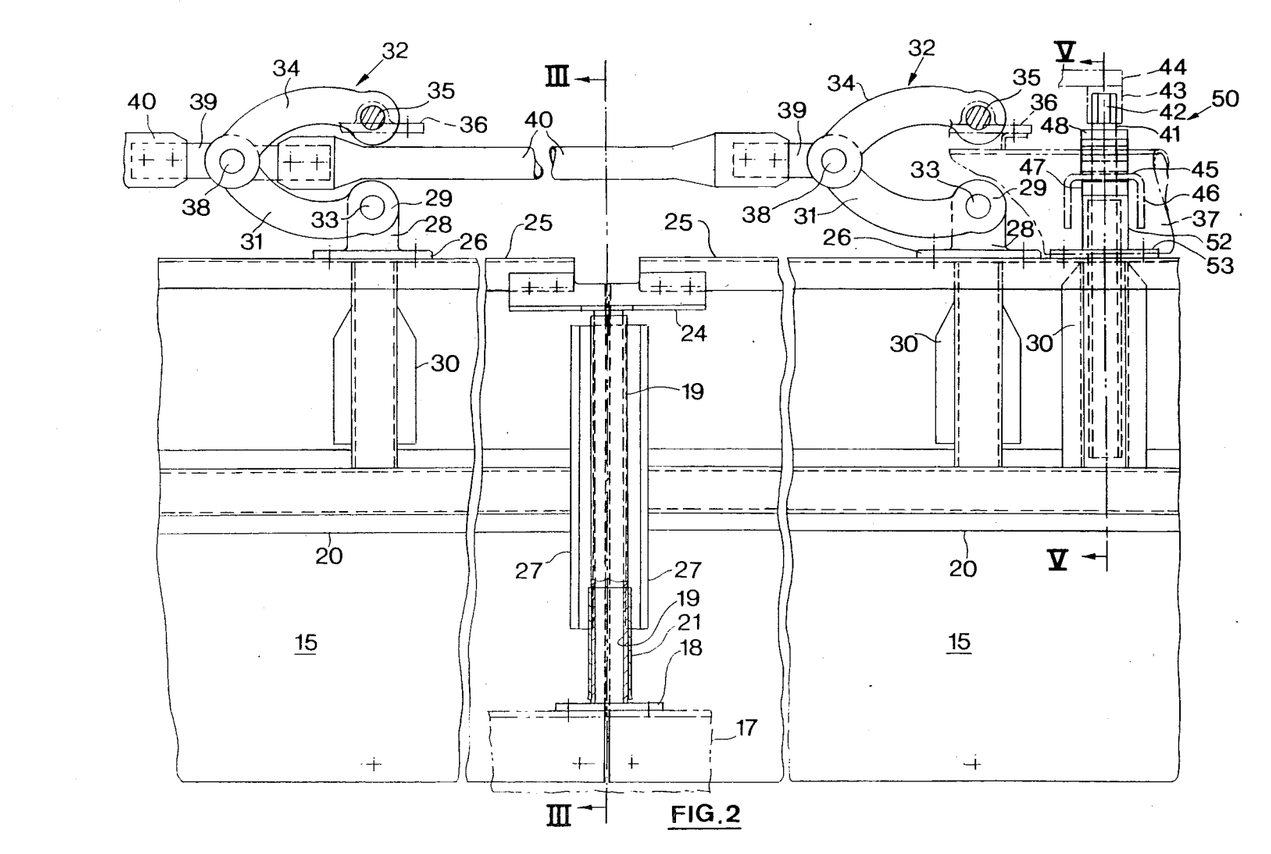
FIG. 2 is an enlarged cross-sectional view along line II—II of FIG. 1, showing a portion of the header.
Figures 3, 4:
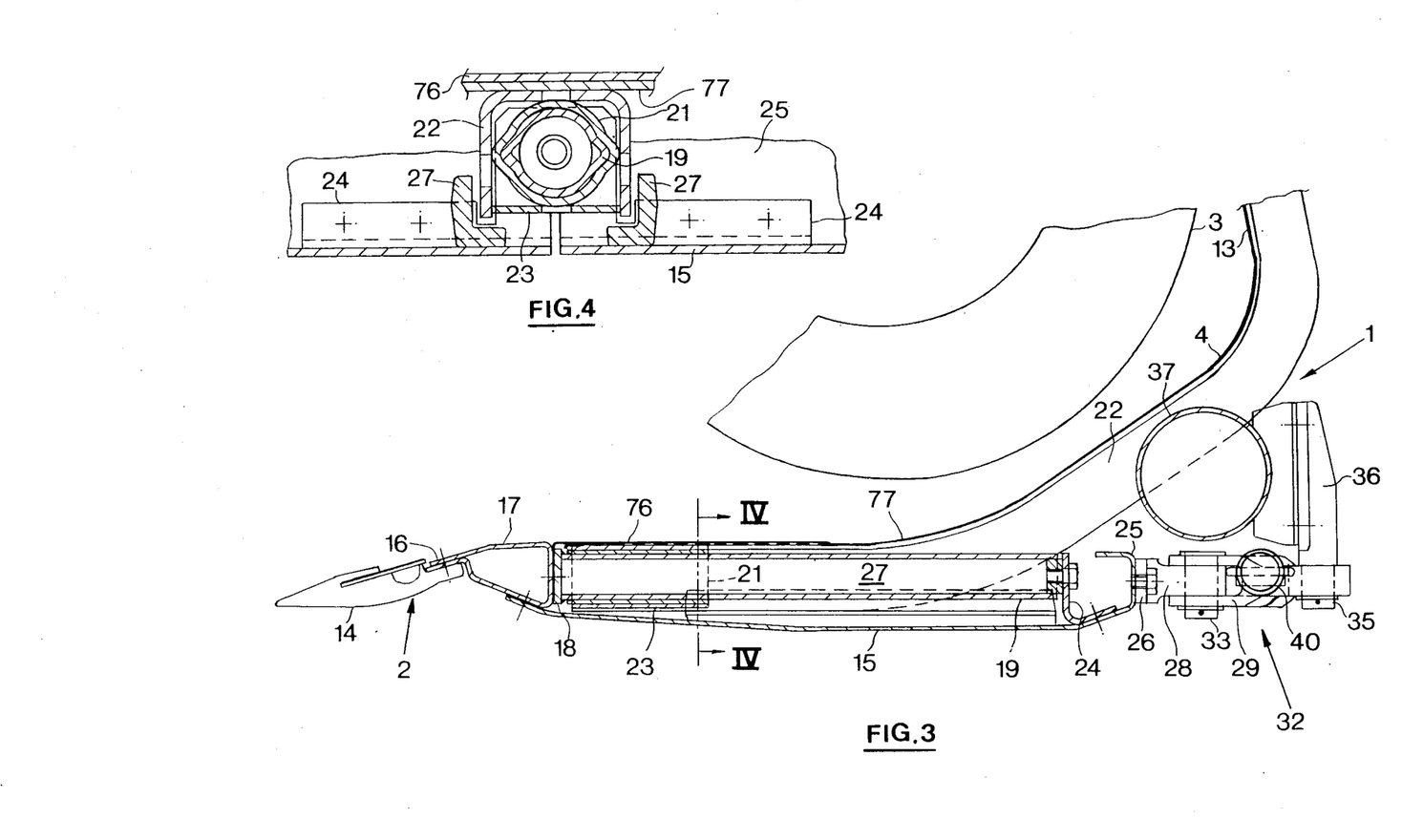
FIG. 3 is an enlarged cross-sectional view along line III—III of FIG. 2, again with the cutterbar in the fully retracted position.
FIG. 4 is a cross-section taken along line IV—IV of FIG. 3.

Referring now to FIGS. 1–5, the cutterbar 2 comprises a plurality of knife guards 14 which are bolted on a flange 16 of a hollow transverse beam 17, as best seen in FIG. 3. Attached to the rear face of the beam 17 at spaced intervals therealong, via plates 18, are a plurality of inner ones 19 of pairs of telescopic members 19,21, the outer members 21 being attached to respective curvilinear frame members 22. The frame members 22 are of inverted U-section with this section being closed by plates 23 (FIG. 4) at the portions attached to the outer telescopic members 21. The pairs of telescopic members 19,21 have a cross-sectional shape in the general form of a lemon (as seen in FIG. 3) these being readily available components having the necessary structural strength and sliding characteristics but components of other cross-sectional shape may, of course, be employed. It will be seen from FIG. 3 that the telescopic members 19,21 are not co-extensive, the inner members 19 extending beyond the outer members 21 and being connected at their rear ends to generally L-shaped brackets 24 which themselves extend between and are connected to adjacent ends of the rear edges 25 of shows 15. Individual shoes 15 extend in between adjacent pairs of telescoping members 19,21. These shoes 15 are secured to the beam 17 of the cutterbar 2 at their forward edges and have rear edges which are turned up to form U-channels 25 for reinforcing said shoes.

Depending on the width of the header, preferably three or five shoes 15 are provided, which means that also four, respectively six pairs of telescoping members 19,21 are provided. The shoes 15 together form a ground contacting surface for the header which extends substantially across the full width thereof; the facing edges of the individual shoes 15 being positioned generally at the location of the corresponding telescoping members 19,21. The cutterbar 2, with the beam 17, the inner telescoping members 19, the L-shaped brackets 24 and the shoes 15 together thus form a rigid structure which is fore-and-aft adjustable relative to the header auger 3.

Reinforcing profile members 20 and 30 are welded to the upper surface of each shoe 15; the member 20 extending generally parallel to the corresponding U-channel 25 and the member 30 extending generally in the fore-and-aft direction between the respective U-channel 25 and the corresponding transverse member 20 generally midway of the width of the shoe 15.

The bottom of each U-channel 25 carries a bracket 26 generally in alignment with the corresponding reinforcing member 30. Reinforcing L-shaped ribs 27 are provided on the upper surface of the shoes 15 and are disposed to slidingly engage with the lower edges of the U-shaped frame members 22 when the shoes 15 are deformed slightly under the weight of the header when supported on the ground. The L-shaped ribs 27 further also have a sealing function to prevent the ingress of dirt into the space above the shoes 15.

Each bracket 26 carries a lug 28 which is received between the bifurcated end 29 of one half or limb 31 of a wishbone-shaped linkage 32 as best seen in FIG. 2, the linkage 32 acting as actuating means for fore-and-aft adjustment of the cutterbar 2. As one linkage 32 is associated with each shoe 15, there preferably are provided in total respectively three or five such linkages 32 depending on the width of the header. The linkage half 31 is pivotally connected to the bracket 26 by a pivot pin 33, and one end of the other limb or half 34 of the linkage 32 receives a pivot pin 35 which is connected via a bracket 36 to a transverse tubular member 37 forming part of the header frame 1.

The two halves 31,34 of each linkage 32 are pivotally connected together by a pivot pin 38. The adjacent ends of the linkage halves 31,34 are both bifurcated with the end of half 34 receiving the end of half 31 which in turn receives a flat connecting link 39 through which the pivot pin 38 also passes. Except for the two extreme stirrup links 32 (of which one is seen at the top right of FIG. 2), the links 39 extend to either side of the pivot pins 38 to receive the flattened ends of individual tubes 40 which, in combination with the links 39, make up a drive rod which serves to operate all of the linkages 32 simultaneously. It will be remarked that the linkages 32 and the coupling members 39,40 extending therebetween merely act as adjustment synchronization means to the extent that these components do not have to take up any vertically oriented forces of any significance such as the weight of e.g., the cutterbar 2 and the shoes 15, which is beneficial for the accuracy of the synchronization of the adjustment. In other words, this is beneficial to ensure that, during fore-and-aft adjustment, the cutterbar 20 is moved in perfect parallel relationship with its initial position, whereby jamming of the telescoping members 19,21 is avoided.

Adjacent one of the end linkages 32, which is seen at the top right of FIG. 2, there is mounted a drive mechanism 50 which initiates adjusting movement of the cutterbar 2 relative to the header frame 1. This drive mechanism 50 alternatively may be provided adjacent the middle one of the linkages 32 so as to improve even further the adjustment synchronization. This drive mechanism 50 is shown in greater detail in FIG. 5 and comprises a threaded spindle 41 fitted with an hexagonal head 42 at its outer end for engagement by a correspondingly shaped box spanner 43 fitted to one end of a handle 41. The spindle 41 passes through an aperture in a flange 45 of a bracket 46 attached to the frame tube 37 and is prevented from undergoing axial movement relative to the bracket 46 by two bushes 47 and 48 disposed on either side of the flange 45 and separated by thrust washers 49 and 51. The bush 47 is welded to the spindle 41 and the bush 48 is attached thereto by two bolts or screws 60. The spindle 41 is received by a correspondingly threaded nut 52 which is welded to a flange 53 which in turn is bolted to the bottom wall of the U-channel 25 of the adjacent shoe 15.

Figure 6:
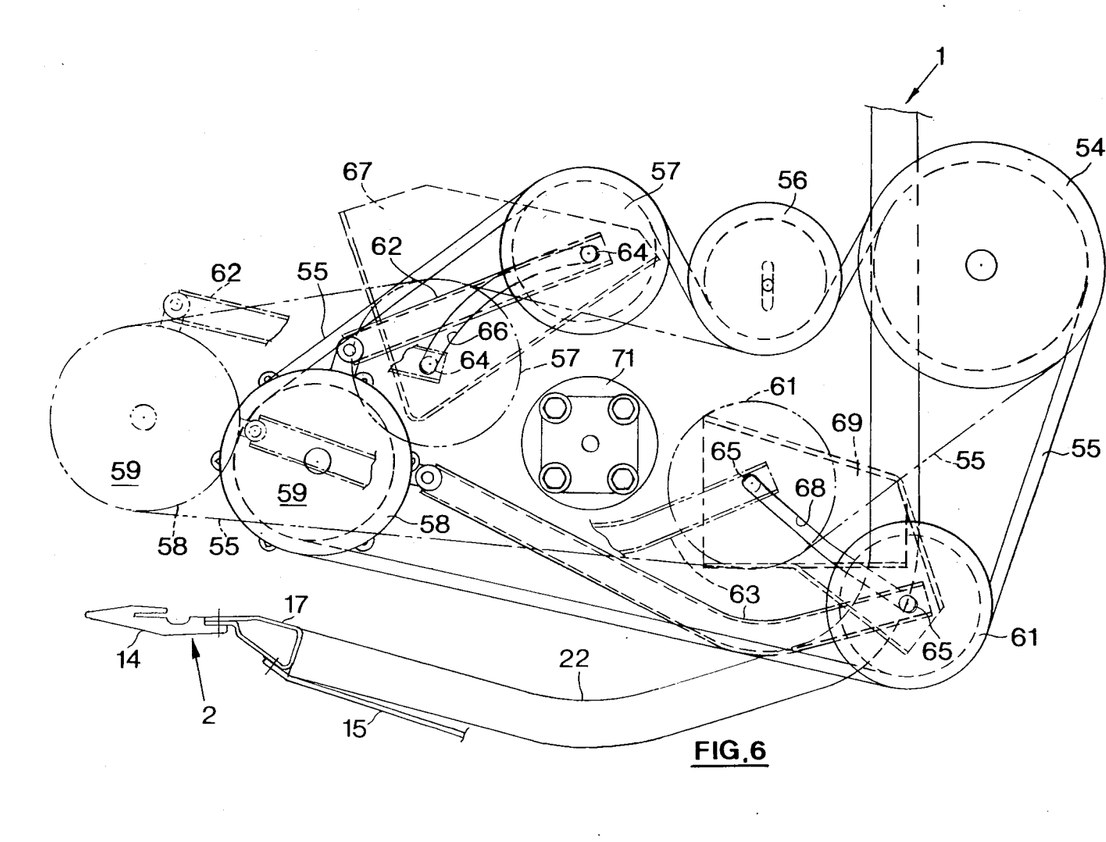
FIG. 6 is a partial side elevational view of the header of FIG. 1 showing the drive for various components.

Referring now to FIG. 6, the drive for the cutterbar 2 is illustrated and this is a belt drive arrangement, whereby it is necessary to make provision in this drive line for movement of the cutterbar when the latter is adjusted. A drive pulley 54 is rotatably mounted on the frame 1 and thus does not move with the cutterbar 2. A belt 55 extends around the drive pulley 54 and around a tension pulley 56, an idler pulley 57, a pulley 58 on a conventional wobble box 59 which converts the rotary drive to a reciprocable drive for the cutterbar 2, and a further idler pulley 61. The wobble box 59 is mounted on the header for movement together with the cutterbar 2 in a fore-and-aft direction relative to the header frame 1. The two idler pulleys 57 and 61 are connected to the wobble box 59 by respective arms 62 and 63, the arms being pivotally connected to both the wobble box and respective stub shafts 64 and 65 of the associated pulleys. The stub shaft 64 of the idler pulley 57 slidably engages a curved slot 66 in a plate 67 attached to a side sheet (not shown) of the header. The stub shaft 65 slidably engages a curved slot 68 provided in a plate 69 also attached to the associated side sheet. Also shown in FIG. 6 is a conventional slip clutch 71 for the auger 3 and it is the presence of this component which dictates the arm and slot arrangements (62,66; 63,68) which could otherwise be simplified.

The full line position of the components illustrated in FIG. 6 is that adopted when the cutterbar 2 is in its fully retracted position, with the idler pulleys 57 and 61, the wobble box 59 and the arms 62 and 63 also being shown in phantom in the fully extended position of the cutterbar 2. It will be seen that the wobble box 59 moves with the cutterbar 2 taking with its the arms 62 and 63, whereby the stub shafts 64 and 65 are pulled along the respective slots 66 and 68, thus moving the idler pulleys 57 and 61 to new positions. It will be seen that the movement of the idler pulleys 57 and 61 is such as to maintain the path length of the belt 55 substantially constant, whereby drive to the cutterbar 2 is not disturbed on cutterbar adjustment.

Figure 7:
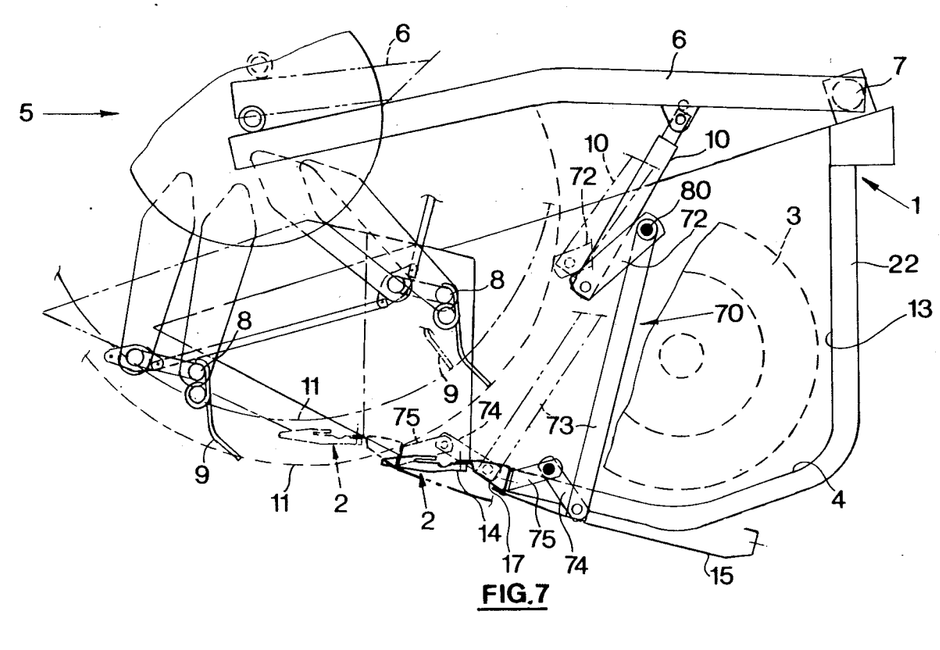
FIG. 7 is a view generally similar to that of FIG. 1 but showing the cutterbar and reel in different adjusted positions.

Turning now to FIG. 7, this illustrates the present invention, namely an interlock 70 between the reel 5 and the cutterbar 2 which prevents interference between the reel tines 9 and the cutterbar 2 upon adjustment of the cutterbar 2 in a forward direction. Such interference indeed could occur if no precautions were taken due to the fact that the cutterbar 2 is adjustable in a plane intersecting with the tine path 11 of the reel 5 when the latter is in its lowermost position, this plane being oriented slightly upwardly as seen in a forward direction. The reason for all this being that the reel tines 9 of the cutterbar 2 when the reel 5 is adjusted for harvesting down crops. Preferably, the reel tines 9 even should reach below the level of the cutterbar 2 when the reel 5 is adjusted for harvesting down crops. Preferably, the reel tines 9 even should reach below the level of the cutterbar at said location and under said condition. Consequently, under these circumstances there could be interference between the cutterbar 2 and the reel tines 9 when the cutterbar 2 is extended. This inevitably would result in damage to the reel tines 9 in the first place, but eventually also to the cutterbar 2 in case the reel tines 9 are made of spring steel, as is conventional, rather than of synthetic material (plastic) as has been proposed in recent years. The interlock 70 according to the present invention prevents this by raising the reel 5 upon adjustment of the cutterbar 2 in the forward direction. Similarly, the interlock 70 also lowers the reel tine path 11 when the cutterbar 2 is retracted so as to maintain the vertical clearance between said path 11 and the cutterbar 2 substantially constant.

The interlock 70 comprises a linkage system which interconnects each hydraulic actuator 10 (which at each side of the header) and the cutterbar 2. Each linkage system comprises a short link 72 pivotally attached at one end to the associated hydraulic actuator 10 and rigidly coupled at the other end to one end of a longer link 73. The links 72,73 thus together form a cranked lever which is pivotally mounted on the associated header sidewall at 80. The other end of the link 73 is pivotally coupled to one end of another short link 74, the other end of the latter in turn being pivotally attached to one end of a link 75 which itself is fixed to the beam 17 carrying the cutterbar 2.

When the cutterbar 2 is adjusted from the fully retracted (full line) position of FIG. 7 to the extended (phantom) position, the crank lever 72-73 of each linkage system is pivoted around pivot 80, thus imparting a lifting to the associated actuator 10 relative to the header, whereby the related reel arm 6 (and hence reel 5) is lifted to the position shown in phantom in FIG. 7. It will be seen from FIG. 7 that the relative vertical position of the reel 5 with its cylinders 10 fully retracted and the cutterbar 2 is maintained substantially constant on adjustment of the cutterbar. It will also be seen that the relative horizontal position of the reel 5 with its cylinders 10 fully retracted and the auger 3 equally is maintained substantially constant on adjustment of the cutterbar 2.

It will be appreciated by those skilled in the art that the foregoing characteristics preferably are combined with the reel adjustments already known in the art. Indeed, the reel 5 also may be lifted at a substantial height above the cutterbar 2 for harvesting standing crop by actuating the hydraulic cylinders 10 whereby the reel arms are pivoted in a clockwise direction as seen in FIG. 1 around pivot 7. When the reel is in such a raised position there is, of course, no risk for interference between the reel tines 9 and the cutterbar 2 and thus the action of the interlock 70 is beneficial only for cutterbar adjustment when the reel cylinders 10 are in their retracted position.

The reel 5 further also may be adjustable in a fore-and-aft direction by making it shiftable relative to the reel arms 6. Fore-and-aft reel adjustment is generally known in the art and is effective to vary the relative horizontal position between the reel 5 and the auger 3 on the one hand the reel 5 and the cutterbar 2 on the other hand. The interlock 70 between the reel 5 and the cutterbar 2 remains operative irrespective of the relative fore-and-aft position of the reel in the event fore-and-aft reel adjustment means are provided.

Figure 5:
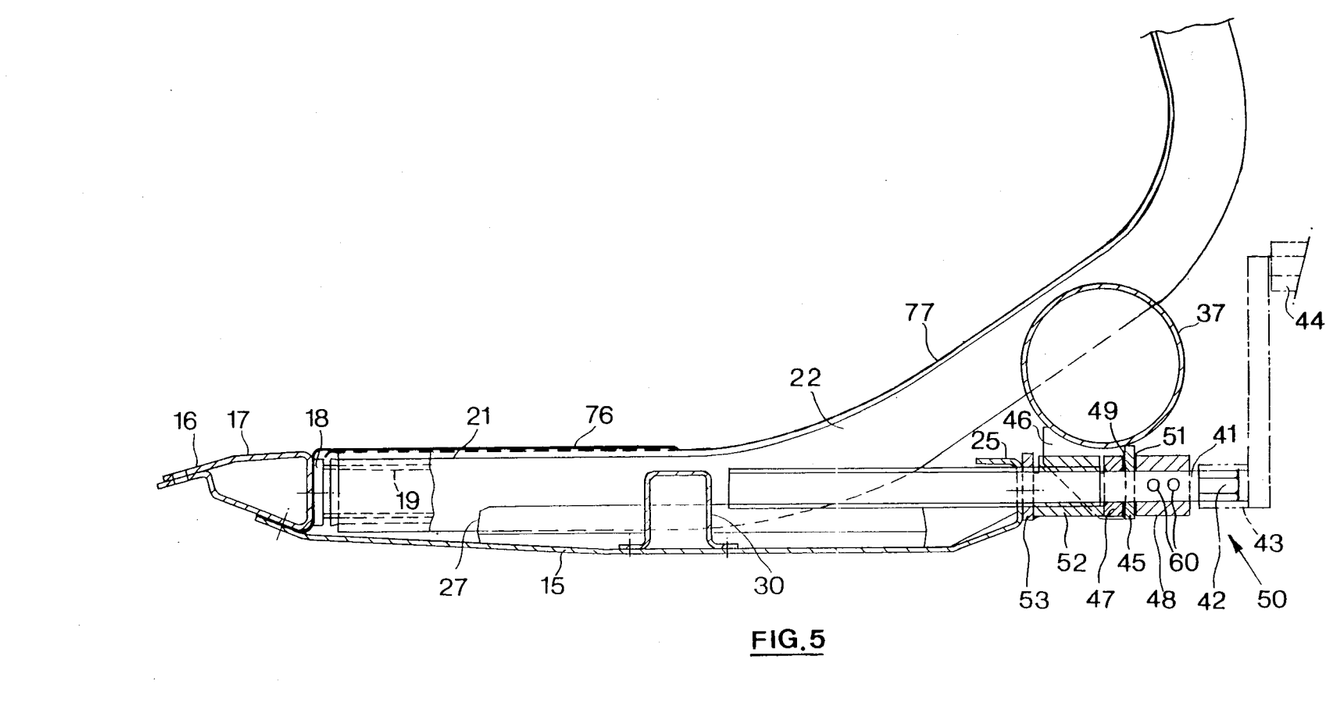
FIG. 5 is a view similar to FIG. 3 but taken on the line V—V of FIG. 2 with the cutterbar in the fully retracted position.

Returning now to FIGS. 1 to 6, the cutterbar 2 is adjusted by taking the handle 44 and engaging the head 42 with the box spanner end 43 of the handle. The handle is then actuated to rotate the spindle 41 in the required direction, according to whether the cutterbar 2 is to be extended or retracted. For present purposes of description, it will be assumed that cutterbar extension is required, whereby the spindle 41 is rotated to move the nut 52 to the left (as seen in FIG. 5) and take with it the associated shoe 15 and hence the cutterbar 2 which is attached thereto, the inner members 19 of the telescopic members 19,21 associated with said shoe sliding within the corresponding outer members 21. Movement of the shoe 15 associated with the drive mechanism 50 in this manner will initially pull apart the halves 31,34 of the wishbone linkage 32 immediately adjacent the spindle 41. Since the linkage half 34 is pivotally coupled to the fixed frame member 37, separation of the two halves 31,34 pulls the interconnecting pivot 38 to the right (as seen in FIG. 2), whereby the drive rod made up of the links 39 and tubes 40 also is pulled to the right, thus opening all of the other wishbone linkages 32 and thus effecting the same adjustment movement of the corresponding shoes 15 along the entire length of the cutterbar 2 resulting in a corresponding adjustment of the cutterbar 2.

It will be appreciated that, on extension of the cutterbar 2 in the fore-and-aft direction of the machine to which the header is fitted, the inner members 19 of the telescopic members 19,21 are pulled out of the outer members 21. In order to maintain a solid floor to the auger trough 4, plates 76 are attached to the beam 17 which are slidable over plates 77 (FIG. 5) attached to the frame 1 and forming the main floor of the auger trough 4. Preferably these plates 76 are made of resilient sheet material and are shaped and positioned to resiliently engage the plates 77 in overlapping relationship.

As already described, the drive to the cutterbar 2 remains effective during cutterbar adjustment by virtue of the idler pulleys 57 and 61 and arms 62 and 63, and interference of the idler pulleys 57 and 61 and arms 62 and 63, and interference between the cutterbar 2 and the reel tines 9 is avoided by virtue of the interlock 70 shown in FIG. 7.

Thus the present invention provides a header with a cutterbar which is adjustable generally fore-and-aft of the machine to which the header is fitted, this adjustment automatically altering the position of the reel relative to the cutterbar by virtue of the provision of the interlock mechanism between these two components whereby interference between these two components, upon fore-and-aft adjustment of the cutterbar, automatically is avoided. It will also be understood by one skilled in the art that an automatic adjustment of the reel position in response to the fore-and-aft movement of the cutterbar is particularly important under circumstances where the cutterbar movement can be accomplished on the go, i.e., during operation of the combine. Such an operation can be had by utilizing a remotely controlled rotary actuator operably connected to the spindle 41.

It will be understood that changes in the details which have been described and illustrated to explain the nature of the invention will occur to and may be made by those skilled in the art upon a reading of this disclosure within the principles and scope of the invention. As an example, it will be appreciated that the interlock mechanism 70 may be disposed between the cutterbar 2 and the pivot 7 for the reel arms 6, whereby cutterbar movement results either in rotation of the reel arms 6 about the pivot 7 or shifting of the reel arm pivot axis 7 itself so as to maintain a substantially constant reel/cutterbar gap. It will be appreciated that linkage mechanisms other than those illustrated in the drawings may be employed in the interlock arrangement. Furthermore, the interlock mechanism may be hydraulic; for example, a slave cylinder may be provided between the cutterbar 2 and the header frame 1 so that, as the cutterbar is adjusted, the length of the slave cylinder changes and the resulting oil displacement is used to control the main actuators 10 so as to raise or lower the reel 5, as appropriate.

It will be noted that, with the interlock mechanism 70 as described in detail and with the alternatives briefly mentioned herebefore, the reel position is varied upon adjustment of the cutterbar irrespective of what the initial reel/cutterbar spacing is, i.e., the reel is repositioned also when the reel is in a raised position for harvesting upright crops. Although repositioning of the reel under these circumstances is not required for any reason, it also has no adverse effect on the operation of the header. It will be noted that it is essential to adjust the reel position relative to the cutterbar upon fore-and-aft adjustment of the latter only when the reel is in close proximity to the cutterbar as only then risks for interference exist. Accordingly and although the embodiment shown in FIG. 7 is the preferred embodiment for reason of its simplicity, it is equally useful to provide an arrangement wherein the reel position relative to the cutterbar is adjusted in response to fore-and-aft cutterbar adjustment only when the reel is positioned with its tine path in the immediate vicinity of the cutterbar. In other words the interlock mechanism according to the invention may control the minimum reel height relative to the cutterbar upon fore-and-aft cutterbar adjustment and remain inoperative during fore-and-aft cutterbar adjustment when the reel is positioned at a substantial height above the cutterbar for harvesting upright crop.

This may be accomplished by providing adjustable stops for the reel arms which prevent lowering of the reel below a given minimal spacing above the cutterbar, these stops being adjustable in response to fore-and-aft cutterbar adjustment by an interlock mechanism of the type disclosed in FIG. 7. This interlock mechanism operatively couples the stops with the cutterbar in a manner to raise these stops when the cutterbar is adjusted in the forward direction and vice versa.

When, during operation, the reel supporting cylinders 10 are fully retracted whereby the reel arms rest on said stops and the cutterbar is extended resulting in a lifting of the stops, a corresponding raising of the reel together with said stops is obtained. To facilitate this it may be necessary to telescopingly couple the plunger rods of the reel cylinders to the reel arms whereby these reel arms can be pivoted upwardly without the plungers having to follow this movement whereby it is prevented that a vacuum is formed below the plungers when the reel is lifted relative to the reel cylinders which in turn could cause problems by the introduction of air into the hydraulic system.

Having thus described the invention, what is claimed is:

1. In a header for a harvesting machine having a frame; a cutterbar mounted on the frame for fore-and-aft adjustment relative thereto; a reel rotatably supported between a pair of reel arms pivotally mounted on the frame and operable to sweep crop material towards and over the cutterbar; a hydraulic actuator extending between each reel arm and a corresponding side wall of said header frame to effect a generally vertical movement of said reel, the improvement comprising:
   an interlock mechanism operably interconnecting the cutterbar and the hydraulic actuator at each side of the header for adjusting the position of the reel in response to a fore-and-aft adjustment movement of the cutterbar to maintain substantially constant the spacing between the reel and the cutterbar upon fore-and-aft adjustment thereof so that interference between the reel and the cutterbar due to a repositioning of the cutterbar relative to the frame is avoided, said interlock mechanism including a linkage mechanism at each side of the header, each linkage mechanism including a bell-crank lever pivotally mounted on the corresponding header side wall.

2. The header according to claim 1 wherein each said bell crank lever extends between a corresponding end of the cutterbar and a corresponding hydraulic actuator in a manner to vertically move said hydraulic actuator upon said fore-and-aft cutterbar adjustment movement.

3. The header according to claim 2 wherein each linkage mechanism comprises a coupling link pivotally attached at one end to the cutterbar and at the other end to one leg of the bell-crank lever.

4. The header according to claim 3 wherein each coupling link is connected to the cutterbar via further link to which it is pivotally connected at one end thereof and which itself is rigidly attached at its other end to the cutterbar.

* * * * *